United States Patent [19]

Suehiro et al.

[11] Patent Number: 4,473,904
[45] Date of Patent: Sep. 25, 1984

[54] SPEECH INFORMATION TRANSMISSION METHOD AND SYSTEM

[75] Inventors: Akio Suehiro, Yokohama; Akira Ichikawa, Kokubunji, both of Japan

[73] Assignee: Hitachi, Ltd., Tokyo, Japan

[21] Appl. No.: 363,146

[22] Filed: Mar. 29, 1982

Related U.S. Application Data

[63] Continuation of Ser. No. 100,096, Dec. 4, 1979.

[30] Foreign Application Priority Data

Dec. 11, 1978 [JP] Japan .................................. 53-152064

[51] Int. Cl.$^3$ .............................................. G10L 1/00
[52] U.S. Cl. ........................................................ 381/36
[58] Field of Search ............... 179/1 SA, 1 SC, 1 SM; 340/148, 152 R; 379/95; 381/41–50

[56] References Cited

U.S. PATENT DOCUMENTS

| | | | |
|---|---|---|---|
| 2,771,509 | 11/1956 | Dudley et al. | 179/1 SA |
| 3,020,344 | 2/1962 | Prestigiacomo | 179/1 SC |
| 3,662,115 | 5/1972 | Saito et al. | 179/1 SA |
| 3,892,919 | 7/1975 | Ichikawa | 381/51 |
| 4,038,495 | 7/1977 | White | 179/1 SA |

OTHER PUBLICATIONS

Flanagan, "Speech Analysis, Synthesis, Perception", Springer Verlag, 1972, pp. 203, 338.

Primary Examiner—E. S. Matt Kemeny
Attorney, Agent, or Firm—Antonelli, Terry & Wands

[57] ABSTRACT

Speech information communicating method and apparatus for transmitting speech information through a transmission system having a low bit rate transmission capacity such as Telex to a receiver station for reproduction. The apparatus comprises at the side of transmitter station a speech recognition device for extracting by high data compression a character train corresponding to syllable units or phonetic symbol from an input speech and simultaneously determining accent types of words or phrases contained in a character train, and a code converter for encoding the extracted character train and the identified accent type in the form of Telex code, unoccupied Telex codes being allotted to the accent type codes and for producing an encoded speech information signal including a time series of character codes having the accent type identifying codes inserted therein. The receiver station includes a decoder for decoding the encoded speech information signal from a transmission channel into the character code train and the accent identifying code, a signal processing circuit for converting the derived character code train into a syllable-based time series signal while preparing accent type identifying signal from the accent identifying code, thereby to produce a speech synthesis control signal, a speech synthesizer for reading out voice waveform signals to be synthesized from a voice waveform storing memory in accordance with the speech synthesizing control signal, and converter for converting the readout voice waveform signal into a corresponding audible speech signal. The output from the encoding circuit of the transmitter can be once recorded on a Telex tape and transmitted to the receiver later on by an automatic Telex sender system. At the receiver station, the received speech code information can be recorded and reproduced later on by a speech decoding apparatus provided with a tape reader having a speech restoring function.

7 Claims, 10 Drawing Figures

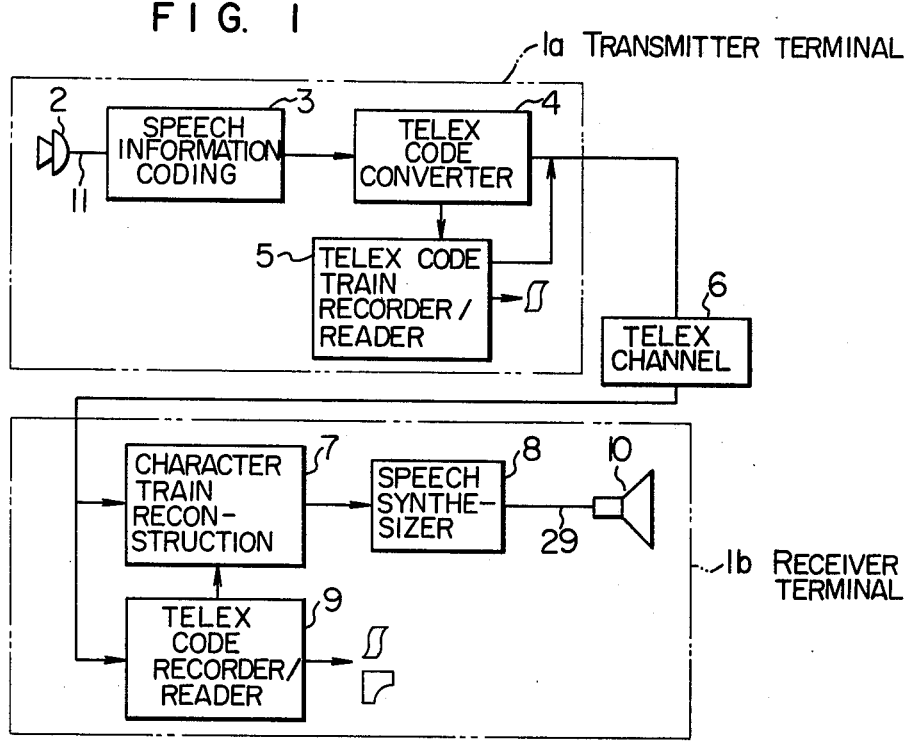
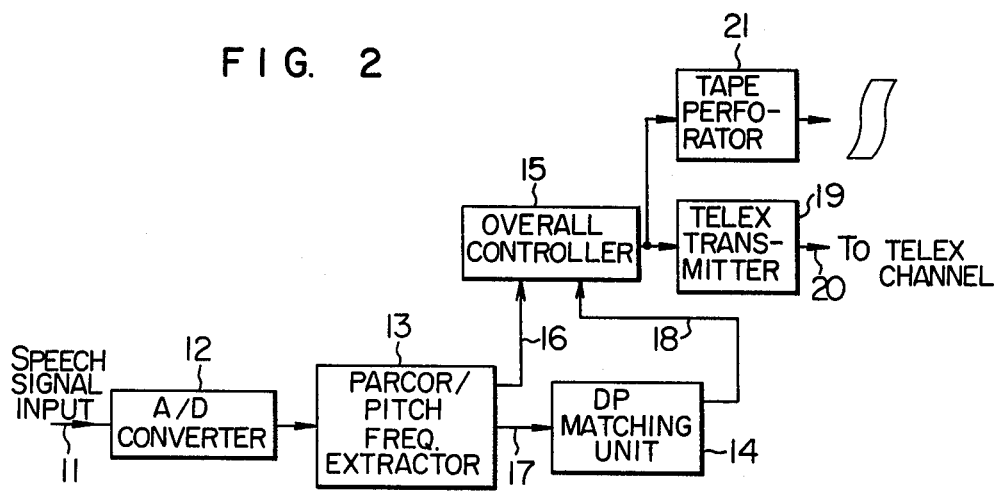

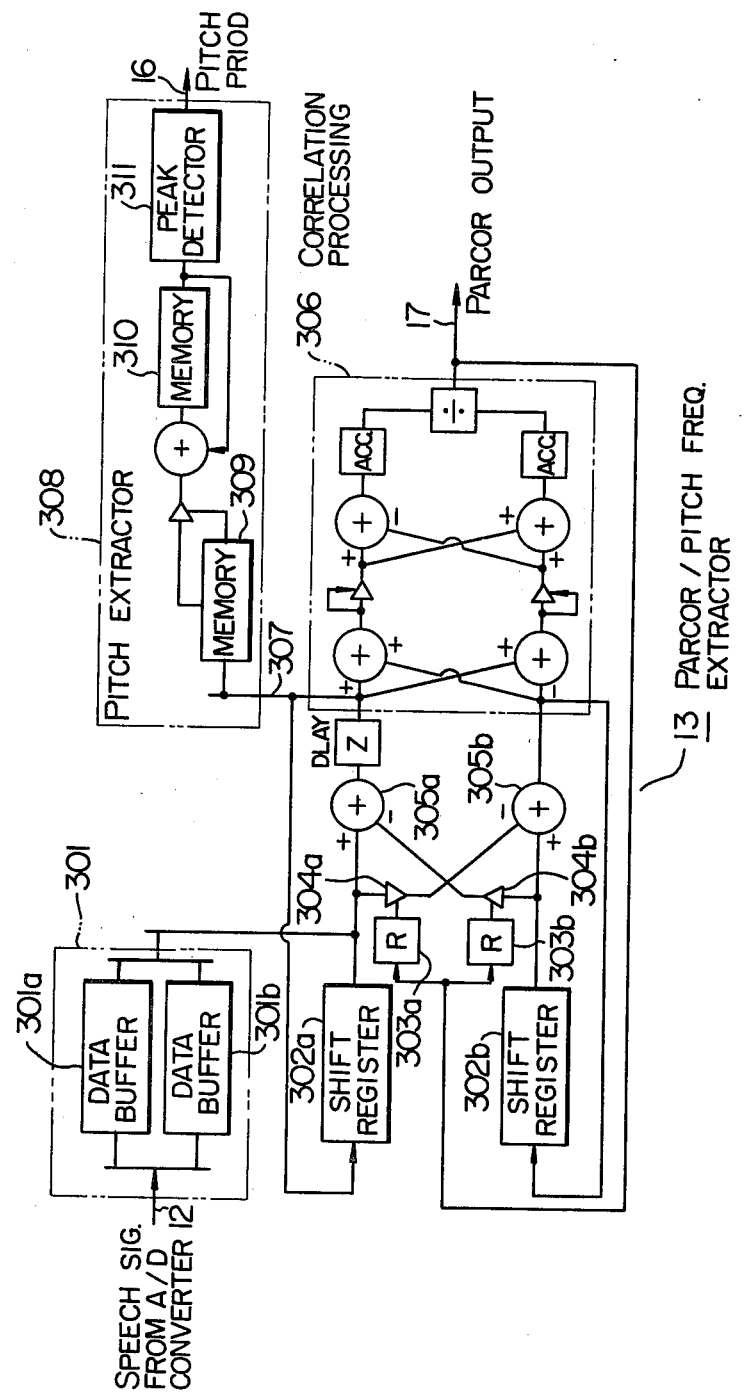

FIG. 6

| BIT PATTERN | HIGH STAGE | MID STAGE | LOW STAGE | BIT PATTERN | HIGH STAGE | MID STAGE | LOW STAGE |
|---|---|---|---|---|---|---|---|
| o | | BELL | | o o | R | 4 | コ (ko) |
| o | W | 2 | フ (fu) | o | 4 | # | ケ (ke) |
| o o | 2 | [1] | ヒ (hi) | o o | [17] | / | ス (su) |
| o | | LINE FEED | | o o o | [18] | [19] | [20] |
| o o | P | 0 | ヤ (ya) | o o | K | . | リ (ri) |
| o o | . | [2] | ル (ru) | o o | [21] | [22] | [23] |
| o o o | O | £ | メ (me) | o o o | Q | | ホ (ho) |
| o | | SPACE | | o o o | I | [24] | ヘ (he) |
| o o | | PERFO. START | | o o | G | ‡ (i) | イ (i) |
| o o | A | - | ハ (ha) | o o o | [25] | [26] | [27] |
| o o o | [3] | [4] | [5] | o o | T | 5 | チ (chi) |
| o o | U | 7 | ウ (u) | o o o | 5 | [28] | ト (to) |
| o o o | 7 | @ | ワ (wa) | o o o | 0 | 9 | ナ (na) |
| o o o | Y | 6 | ヨ (yo) | o o o o | 9 | $ | モ (mo) |
| o o o o | 6 | [6] | ラ (ra) | o o o | [29] | 0 | " |
| o | | RETURN | | o o o o | [30] | | |
| o o | & | = | ロ (ro) | o o | I | 8 | ン (n) |
| o o | S | ユ (yu) | タ (ta) | o o | 8 | ¥ | ム (mu) |
| o o o | | PERFO. END | | o o o | V | ヲ (o) | オ (o) |
| o o | E | 3 | ク (ku) | o o o | | WHO ARE YOU | |
| o o o | 3 | % | ネ (ne) | o o o o | F | ソ (so) | シ (shi) |
| o o o | H | ヌ (nu) | マ (ma) | o o o o | | MID. STAGE | |
| o o o o | [7] | [8] | [9] | o o o o | | BACK | |
| o o | B | ) | キ (ki) | o o o | N | ⊥ | ツ (tsu) |
| o o o | M | [10] | ノ (no) | o o o | | * | ア (a) |
| o o o | D | レ (re) | カ (ka) | o o o | Z | + | ニ (ni) |
| o o o | [11] | [12] | [13] | o o o | | ? | ミ (mi) |
| o o o | X | ( | セ (se) | o o o o | C | . | テ (te) |
| o o o | | HIGH STAGE | | o o o o | L | エ (e) | エ (e) |
| o o o o | J | : | サ (sa) | o o o o | | LOW STAGE | |
| o o o o o | [14] | [15] | [16] | o o o o o | | DELETE | |

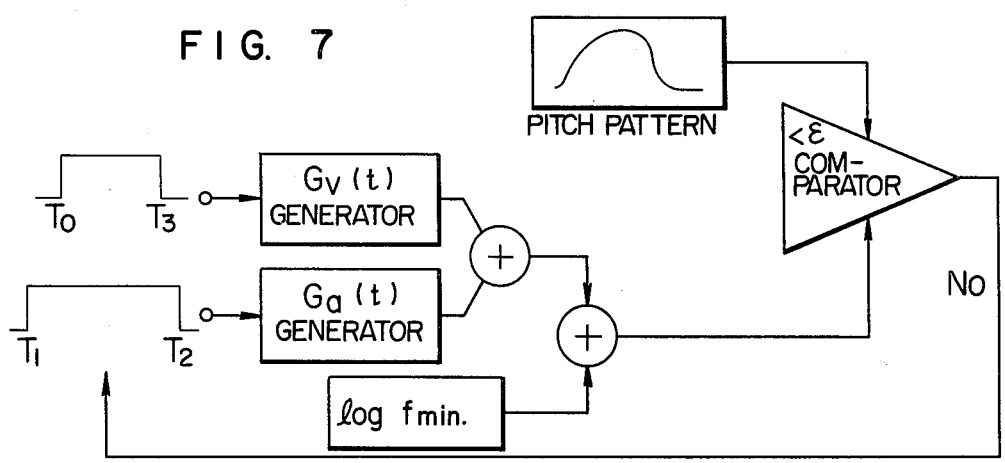

FIG. 7

SPEECH INFORMATION TRANSMISSION METHOD AND SYSTEM

This is a continuation of application Ser. No. 100,096 filed Dec. 4, 1979.

The present invention relates generally to a speech information transmission method and apparatus, and more particularly to a speech information communication method and apparatus which permits the speech information to be transmitted through a teleprinter exchange service system which will hereinafter be referred to simply as a Telex system.

At present, the speech information processing technologies are becoming highly advanced. For example, in the speech analyzing and synthesizing technology, there has been proposed an audio response apparatus using partial autocorrelation techniques in Saito et al U.S. Pat. No. 3,662,115 issued May 9, 1972. According to such techniques of partial autocorrelation coefficient extracting called "PARCOR", it has become possible to extract speech features or parameters from speech information with a reduced quantity of data. Further, a real-time speech recognition can be realized with an improved recognition reliability by matching the extracted speech parameters with basic or standardized speech patterns through a matching procedure. By virtue of the now available advanced speech synthesis and recognition techniques, an audio response apparatus exhibiting high efficiency has been inexpensively implemented without requiring a large capacity of memory for storing speech information such as standardized speech data. Further, a speech recognition system is on the way of being increasingly used for practical applications.

On the other hand, there is a proposal for transmitting speech information with a reduced data quantity by resorting to data compression techniques. For example, reference is to be made to Japanese Laid-Open patent application No. 115704/1974 laid open on Nov. 5, 1974 and filed by the assignee of the present application. According to this prior art technique, speech parameters are extracted from speech information at a transmission terminal. Data of the extracted speech parameters is transmitted through a transmission channel to a reception terminal, at which the speech information signal is reproduced by editing the standardized speech data. However, when the data compression technique with the PARCOR technique according to Saito et al U.S. patent recited above is compared with the present-day PCM transmission system, it will be found that the data compression attainable with the aid of the PARCOR technique amounts only to a twentieth or so of that attainable in the PCM transmission system on the assumption that the sampling frequency is 8 kHz and the bit number required for quantization is 8 bits. Accordingly, in order to transmit information through the hitherto known PARCOR technique under the same condition, a high transmission rate on the order of 3200 bits/sec is required. At present, a system for transmitting speech information in a compressed state by using conventional data transmission line having a transmission capability on the order of 2400 bits/sec is in the course of being developed.

For the bit information transmitting means of a low transmission rate, there is known a Telex transmission system which is operative at the transmission rate of about 50 bits/sec. A problem arises in that the Telex is not easy for the user to handle in respect of the real time operation even when the telex system is to be used for the inherent data transmission. In the case of the Telex transmission, contents of information to be inputted through a typewriter at a transmitter station as well as contents of the received information at an output terminal have to be selectively verified under visual observation of operator. Consequently, a great burden is imposed on the operator for the input/output conversion of the information. Particularly, in the case of the character train of Japanese alphabet known as "kana", a considerable difficulty is encountered in grasping contents of the messages expressed in the form of "kana" character trains, because Japanese "kana" is not a hieroglyph but a phonetic symbol. In other words, the character message through the telex is remarkably inferior to the speech message in respect of the understandability. In this connection, it is noted that no proposals have been made to make use of the advantageous features inherent to the telex such as the data transmission at a low bit rate, and the automatic transmission/reception function in the nighttime. Further, no proposal has been made as to the means for enhancing the understandability of the transmitted message by the receiver-side operator.

Accordingly, an object of the present invention is to provide a speech information transmitting method as well as an apparatus for carrying out the method, which permit speech information to be transmitted with the aid of a transmission system having a low bit transmission capability such as Telex equipment.

Another object of the invention is to provide a speech information transmitting method and an apparatus in which information of input speech is compressed to a degree adequate for assuring understandability thereof and extracted as a character data train which is then sent out through a transmission channel by allotting Telex codes to the character data through a matching procedure at a transmitter station, while at a receiver station the encoded character data is decoded to produce a speech message corresponding to the input speech.

Another object of the invention is to provide a speech information transmitting method of the type described above in which the encoded data of the input speech can be once recorded on a recording medium and loaded into a Telex transmitter later on at an appropriate time for the transmission of the speech information.

Still another object of the invention is to provide a speech information transmitting method described above in which the encoded speech data received at an output terminal of a Telex is not only reproduced in the form of an audible speech message but also converted into a readable character message.

According to the principle of the invention, speech is regarded as a kind of code series for communication of information and transmitted in a compressed state with the speech features inherent to specific speakers being neglected. To this end, a speech recognition apparatus is used at the transmitter station to extract characters corresponding to syllables or phonetic symbols from the speech and encode the extracted characters. Additionally, accent type of the words or phrases in the speech may be determined and transmitted to a receiver station together with the character code train. In this manner, transmission of information can be accomplished at a low sampling rate, i.e. in a high compressed state, whereby the speech information can be transmitted through a transmission channel of low bit transmission capability.

At the receiver station, an audio response apparatus is used to reproduce corresponding speech information by synthesizing the syllable or phoneme codes corresponding to those contained in the received character code train. Thus, the speech information is reproduced in the form of a voice of predetermined quality independently from the personality of the speaker who has produce the input speech. In this connection, it is intended that the term "phoneme" means elements of linguistic contents which are produced in voice for communication and can be transferred into characters.

By matching the character codes to the available telex codes, the transmission of speech information can be arbitrarily combined with the inherent operation of the Telex equipment. For example, an input speech encoded and converted to telex codes may be recorded on a paper tape at a transmitter station and later on the Telex tape is loaded into an automatic sender of the Telex for transmission to a destined receiver station at an appropriate time. At the receiver terminal, the incoming character code train may be recoded on a tape and reproduced later on in the form of vocal speech and/or in the form of printed characters as occasion requires.

According to the invention, by virtue of the arrangement that the speech analyzing and synthesizing apparatus is well matched to a Telex system due to the capability of speech transmission at a high compression rate and hence at a low bit transmission rate, it is possible to attain excellent communication facilities with high efficiency such as automatic transmission and reception in the nighttime, which is favorable not only from the economical viewpoint but from the standpoint of human-factors engineering. Further, since the input speech is converted through the speech analyzing or extracting procedure into a train of syllables such as Japanese alphabet train of "ka", "ta" and "chi" (which train means "shape" in English) with the duration of the monosyllable as well as the accent type being converted into many varieties of pattern data, data transmission at a high compression rate which could not be realized in the past can now be accomplished.

The above and other objects, novel features and advantages of the present invention will be become more apparent from the following description taken in conjunction with the accompanying drawings, in which:

FIG. 1 is a block diagram showing a general arrangement of a speech information transmission system according to an embodiment of the invention;

FIG. 2 is a block diagram showing in some detail an arrangement of terminal transmitter equipment in accordance with the present invention;

FIG. 3 is a circuit diagram showing an arrangement of a PARCOR/pitch frequency extractor unit shown in FIG. 2;

FIG. 6 shows examples of code trains to illustrate corresponding relationships between the speech information codes and Telex codes;

FIG. 7 is a block diagram to illustrate an accent type estimate method;

Figure 4A:
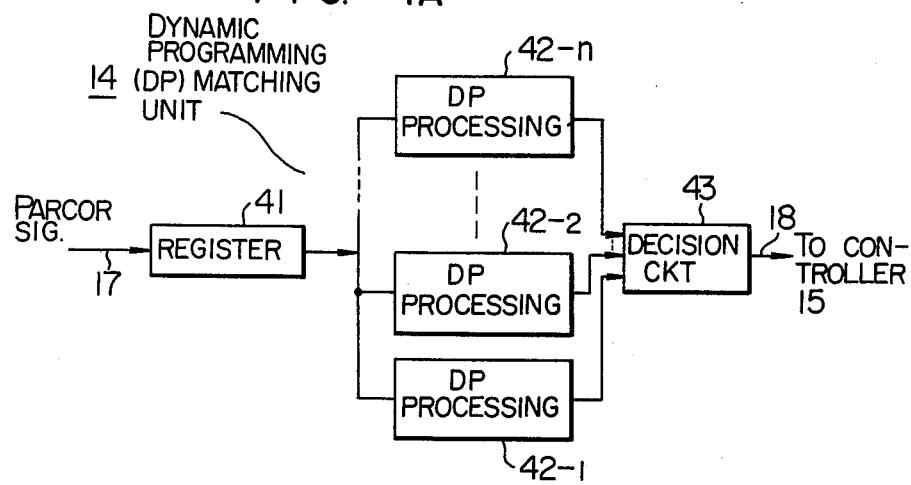
FIG. 4A is a circuit diagram to show in detail an arrangement of a DP matching unit shown in FIG. 2.

Before entering into a detailed description of exemplary embodiments of the invention, the technical background of the speech recognition and reproduction techniques to which the invention can be applied will be first briefly reviewed to give a better understanding of the invention. In the following description, it is assumed that the speech information is processed in terms of Japanese language, only by way of example. However, it should be appreciated that the invention is not restricted to the processing of Japanese speech and the technical backgrounds mentioned below but the basic conception thereof can be applied to the processings of other languages by those skilled in the art. Further, other techniques than those disclosed herein may be adopted for practicing the invention.

There have been proposed various methods for converting speech into a train of syllable codes. The most difficult problem encountered in this connection resides in separating or segmenting speech (inclusive of words, phrases and/or clauses) which is a continuous physical quantity (sound wave) into discrete monosyllable units and in recognizing the contents or information of the individual discrete monosyllable units each of which is likely to undergo variation in respect of physical features or parameters in dependence on the phonemic relation to the preceding and/or succeeding syllables as is in the case of co-articulation. To deal with these problems, there has been known a procedure according to which the phonemic information is recognized on the basis of a VCV (vowel-consonant-vowel) unit, whereby the separation or segmentation into syllables is automatically carried out through a continuous DP (dynamic programming) matching procedure, as will be described below.

A unit of three successive phonemes in a series of vowel (V)-consonant (C)-vowel (V) is generally referred to as VCV unit with some exception that some consonants having physical features similar to those of a vowel such as media as well as a succession of vowels without interposed consonant such as VV are handled as a unit to be processed. For the separation on the basis of VCV unit, a vocal word or speech such as "hana", or Japanese word corresponding to "flower" in English, for example, is segmented in the form of a series of "ƀha"-"ana"-"aƀ", where the symbol ƀ is defined to represent a breath consonant. Because the consonant is more susceptible to influences of the preceding or succeeding elements than the vowel, the processing on the VCV unit base will reduce the phonological influence exerted by the preceding and/or succeeding element. In the phoneme recognition apparatus, all the possible combinations of VCV units (usually about 800 varieties in the case of Japanese language although this number varies more or less in dependence on admissible exceptions and modifications) are previously stored in a standard pattern memory, wherein the input speech is successively compared to the patterns read out from the memory, to thereby extract the matched VCV and re-edit on the syllable unit base to produce a corresponding character code. For example, upon detection of VCV train consisting of "ƀna"-"ano"-"oha"-"ana"-"aƀ", the adjacent vowels are synthesized to output a Japanese word "na"-"no"-"ha"-"na" or "ｽﾉﾊﾅ" (which means ripe-blossoms in English) through combination of consonants C and vowels V.

There have also been proposed various methods of evaluating likelihood between the input speech wave patterns and the standard patterns stored in the memory. Hereat, description will be made of an evaluating method with the aids of partial autocorrelation coefficients. The partial autocorrelation coefficients (PARCOR) as well as the extracting method therefor are hitherto known techniques. A typical example of apparatus for determining partial autocorrelation coefficients $k_1$ to $k_n$ is disclosed in Kitawaki et al article "The Optimum Coding and Implementation in PARCOR Speech Analysis-Synthesis System", the Institute of Electronic Communication Engineers (IECE) in Japn, Technology Committee's Report EA-75-29 (1975). According to this prior art method, likelihood between the partial autocorrelation coefficients $^Sk_1, \ldots, ^Sk_n$ of the standard speech pattern read out at a certain time and the partial autocorrelation coefficients $^Ik_1, \ldots, ^Ik_n$ of an input speech at the certain time point is evaluated in dependence on the value of d which is given by the following expression:

$$d = \frac{1}{n} \sqrt{\sum_1^n (^Sk_i - ^Ik_i)^2}$$

It is apparent that the likelihood between the standard speech pattern and the input speech pattern becomes higher as the value of d is smaller. Evaluation of the degree of likelihood between a certain section of the input speech and a certain VCV of a standard speech can be realized through a continuous DP procedure such as one disclosed in the article by Ryuichi Oka "Continuous Word Recognition by Use of Continuous Dynamic Programming for Pattern Matching" Acoustical Society of Japan, Speech Study Group's Data S78-20, (June, 1978). Through the continuous DP recognition procedure, it is possible to convert the input speech into corresponding character codes.

The accent type of Japanese words is a pitch accent and can be definitely identified in dependence on the position of that time point between the syllables at which the pitch frequency changes abruptly to a low frequency. This can be appreciated by reference to "Dictionary Of Pronounciations And Accents of Japanese Language" published by NHK. The pitch frequency can be determined on the basis of the autocorrelation coefficients of an estimated residual wave obtained concurrently when the partial autocorrelation coefficients are determined. The time point at which the pitch frequency undergoes abrupt change is estimated or determined by a procedure described in the article by Fujisaki et al "Analysis, Synthesis and Perception of Accent Types of Two-Mora Words in Tokyo and Kinki Dialects", Acoustical Society of Japan, Speech Research Group's Data S73-51 (March, 1974). In the case of the Japanese language, the function of the accent is to unite individual syllables to one word rather than to discriminate them to other words. That is, the accent contributes little to discrimination of words in respect of the meanings or contents thereof. In particular, the accent functions scarcely to make clear the contents or connotation of word inclusive of context. Accordingly, it is not indispensably necessary to transmit the accent information with high accuracy. Under certain circumstances, an estimated accent attached to the reproduced word or speech at the receiver terminal will be sufficient for understanding the contents of a message, although some artificialness cannot be evaded. Duration of a syllable provides no information or data except for a special case. Accordingly, it is unnecessary to send information about the durations or time lengths of syllables. Information as to long or short syllable which can be determined by checking the duration of an associated syllable upon extraction thereof will be sufficient. It is possible to estimate the duration of a syllable in consideration of the variety of the syllable and/or the associated type of accent at the receiving or reproducing terminal. A typical procedure for estimating the duration of a syllable is disclosed in the article by Nakajima and Ichikawa "Generation Rule of Syllable Durations in Various Words", Reports of the 1974 Spring Meeting in Acoustical Society of Japan 3-2-16 (June, 1974).

A speech information reproducing system for synthesizing speeches from character codes is described in the article by Ichikawa and Nakada "A Method of Speech Segment Generation in Speech Synthesis of Monosyllables Edition" Transaction of IECE in Japan, '75 Vol. 58D, No. 9, p. 522 (September, 1975) and the Japanese Laid-Open Application recited hereinbefore.

Now, description will be made in detail of exemplary embodiments of the invention by referring to the drawings.

FIG. 1 shows schematically a general arrangement of a Telex system (teleprinter exchange system) to which a speech message transmission apparatus according to the invention may be applied. In this figure, reference 1a and 1b designate, respectively, a terminal transmitter station and a terminal receiver set or station which are connected to each other through a Telex channel 6 so that transmission of speech information can be effected on an on-line basis. The transmitter station 1a comprises pick-up means 2 for detecting audio speech input as an electric signal, character encoding means 3 for compressing the speech information to produce a train of low-bit-rate character codes each corresponding to a syllable or mora, code converter means 4 for converting the character codes into telex codes, and a Telex code train recorder/reader unit 6 for recording and reading the Telex code trains for allowing transmission thereof on the non-real time basis or on an off-line transmission basis. On the other hand, the terminal receiver station 1b includes character code train reconstruction means 7 for restoring the character code train from the input signal received through the Telex channel 6, speech information decoding means 8 for synthesizing speech information from the restored character code trains, a Telex code train recorder/reader unit 9 to receive the Telex code trains simultaneously with the character code train reconstruction means 7 for recording and reproduction, and speaker means 10 for producing audible speech signals in response to the output from the speech information decoding mean 8 which responds to the character code train signal produced through the reconstruction means 7 from the input signal available from the on-line transmission or from the recorder/reader unit 9.

FIG. 2 shows in a block diagram a typical arrangement of the terminal transmitter station shown in FIG. 1. The speech signal supplied through a line 11 is applied to an analog-to-digital (A/D) converter 12 to be converted into a corresponding digital signal which is then supplied to an extractor 13 for extracting partial autocorrelation coefficients and pitch frequencies. The extractor 13 produces a signal representing an extracted partial autocorrelation coefficient on a line 16 and a signal representative of the pitch frequency described hereinbefore on a line 17. A DP matching unit 14 produces on a line 18 a signal representing the results of the DP matching operation performed with reference to the partial autocorrelation coefficient supplied thereto. A central or overall controller 15 which corresponds to the output unit of the message encoder means 13 and which may be constituted by a microcomputer is adapted to operate to estimate or determine an accent type from the pitch pattern, i.e. the pitch frequency series, to thereby generate a signal representing the identified accent type, and convert the results of the DP matching operation into a Japanese syllabary "kana" character series, i.e. syllable series. The signals representing the syllable series and the accent type are sent out through the channel 6 from a transmitter circuit 19 which may be constituted by a conventional one known in the field of the Telex. Further, the output signal from the central controller 15 may be supplied to a tape puncher i.e., tape perforator 21 which serves as the speech code train recorder/reader unit 5. Such a tape puncher is useful for a temporal storage particularly when the speech message is to be transmitted later on or in the nighttime. At that time, the punched tape is of course fed to a tape reader of a tape reading transmitter unit of the Telex.

FIG. 3 shows a typical arrangement of the partial autocorrelation coefficient and pitch frequency extractor unit 13. In this figure, reference numeral 301 designates an input data buffer unit of a dual type for receiving the digital speech signal from the analog-to-digital or A/D converter 12. More particularly, the dual type data buffer 301 is composed of a first data buffer 301a and a second data buffer 301b which are switchably connected so that during the input operation to the first data buffer 301a, the preceding input data placed in the second data buffer 301b is taken out for analytical processings and vice-versa. The partial autocorrelation extractor comprises a whitening filter unit and a correlating unit 306. The whitening filter unit includes a pair of shift registers 302a and 302b, a pair of partial autocorrelation coefficient registers 303a and 303b each denoted by a symbol R, a pair of multipliers 304a and 304b, a pair of summers 305a and 305b and a delay register Z to exhibit flat frequency characteristics. The correlating unit 306 includes summers, multipliers and accumulators and a divider as shown. The output signal representing the extracted partial autocorrelation coefficient is produced on a line 17. By circulating the output signal six times through the partial autocorrelation coefficient extractor circuit, the output signals representing the partial autocorrelation coefficients of first to sixth order are extracted and produced on the output line 17 for every analysis frame. The pitch frequency is determined by loading a residual signal 307 obtained after every sixth circulation into a memory 309 of a pitch frequency extractor circuit 308 with the autocorrelation coefficient signals which have undergone the i-th order delays being successively determined and written into a memory 310. Subsequently, a maximum value in the memory 310 is determined by a peak detector 311, whereby the signal representing the delay order i of the maximum value as detected is produced as the output signal 16 representing the pitch period which corresponds to a reciprocal of the pitch frequency.

FIG. 4A shows a general arrangement of the DP matching circuit 14. The partial autocorrelation coefficients 17 are extracted in dependence on the orders thereof and are successively stored in a register 41. When all the coefficients of desired orders become available, they are concurrently supplied to DP processors 42-1 to 42-n arrayed in parallel to one another. There are provided n (usually about 800) DP processors in dependence on the number of types of VCV. Of course, the intended processings may be executed by a small number of DP processors on the time-division basis. However, for the simplification of illustration, it is assumed here that the DP processors are separately provided for every type of VCV. The outputs from the DP processors are supplied to a decision unit 43 which functions to decide the appearance of the output from of the individual DP processors which is the lowest and not greater than a predetermined threshold value is the appearance of the relevant VCV unit in the speech. The result of decision is transmitted to the central controller 15.

Figure 4B:
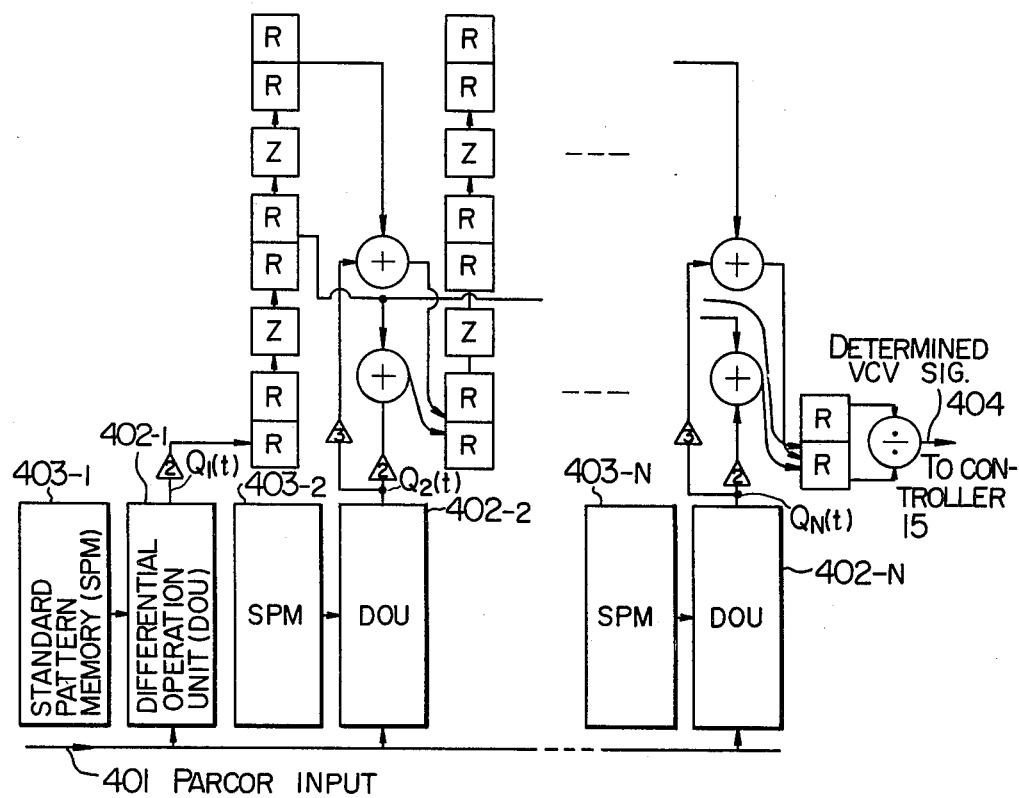
FIG. 4B is a block diagram showing in detail an arrangement of a DP processor shown in FIG. 4A.

FIG. 4B shows an arrangement including each DP processor. The extracted partial autocorrelation coefficients ($k_1$ to $k_6$) 401 are supplied to differential operation units 402-1, 402-2, ..., 402-N. These differential operation units are simultaneously applied with standard patterns $\{S_{k_1}^1, \ldots, S_{k_6}^1\}, \{S_{k_1}^2, \ldots S_{k_6}^2\}, \ldots, \{S_{k_1}^N, \ldots, S_{k_6}^N\}$ from standard pattern memories 403-1, 403-2, 403-N to calculate $$Q j(t) = \sum_1^6 |k_i - S_{k_j}|.$$

In this connection, N represents the length of VCV. The calculation is progressively effected to the right as viewed in the drawing to find the minimum values successively in accordance with the procedures disclosed in the Ryuichi Oka's article "Continuous Word Recognition Using Continuous DP for Pattern Matching" recited hereinbefore, whereby the finally obtained output signal 404 is supplied to the central controller 15. When a series of speech inputs coincide with the standard VCV, the final output signal 404 will be abruptly reduced to a small value lower than the predetermined threshold value, to identify the presence of VCV in the input speech.

The central controller 15 may be constituted by a conventional microprocessor. For example, a microcomputer MC 6800 manufactured by Motorola Inc. may be employed. The contents to be processed by the microprocessor has been described hereinbefore. The processing operations are illustrated in a flow chart shown in FIG. 5. The recognized "kana" series and accent types are converted into codes for Telex transmission. Since no definite codes are allotted for the accent types, vacant or unoccupied codes of Telex transmission may be made use of for encoding the accent types. In the case of Japanese language, transmission of about ten kinds of accent types will usually be sufficient for restoration of the speech message at the terminal receiver station. When reception is made through Telex equipment at the receiver station, the unoccupied codes are not printed out but are instead neglected. The accent types may be expressed by the identification numbers allotted to the syllables in a speech section produced in one breath sequentially from the leading one. Since a single speech segment contains usually no more than twenty syllables in the case of Japanese language, the accent types can be adequately identified by utilizing more than thirty unoccupied codes which are available in telex equipment commonly used in Japan as can be seen from FIG. 6. It is assumed that the accent type is represented by the number allotted to the syllable which precedes immediately to the abrupt decreasing in the pitch frequency, while a boundary speech section is represented by a space. In the case of an exemplary code arrangement illustrated in FIG. 6, symbols [1], [2], [3], ..., [30] represent the unoccupied codes allotted to the accent types. In the present case, accent types up to thirty kinds are made utilizable to assure a high degree of likelihood. The codes for the accent types are added to "kana" code train.

Figure 5:
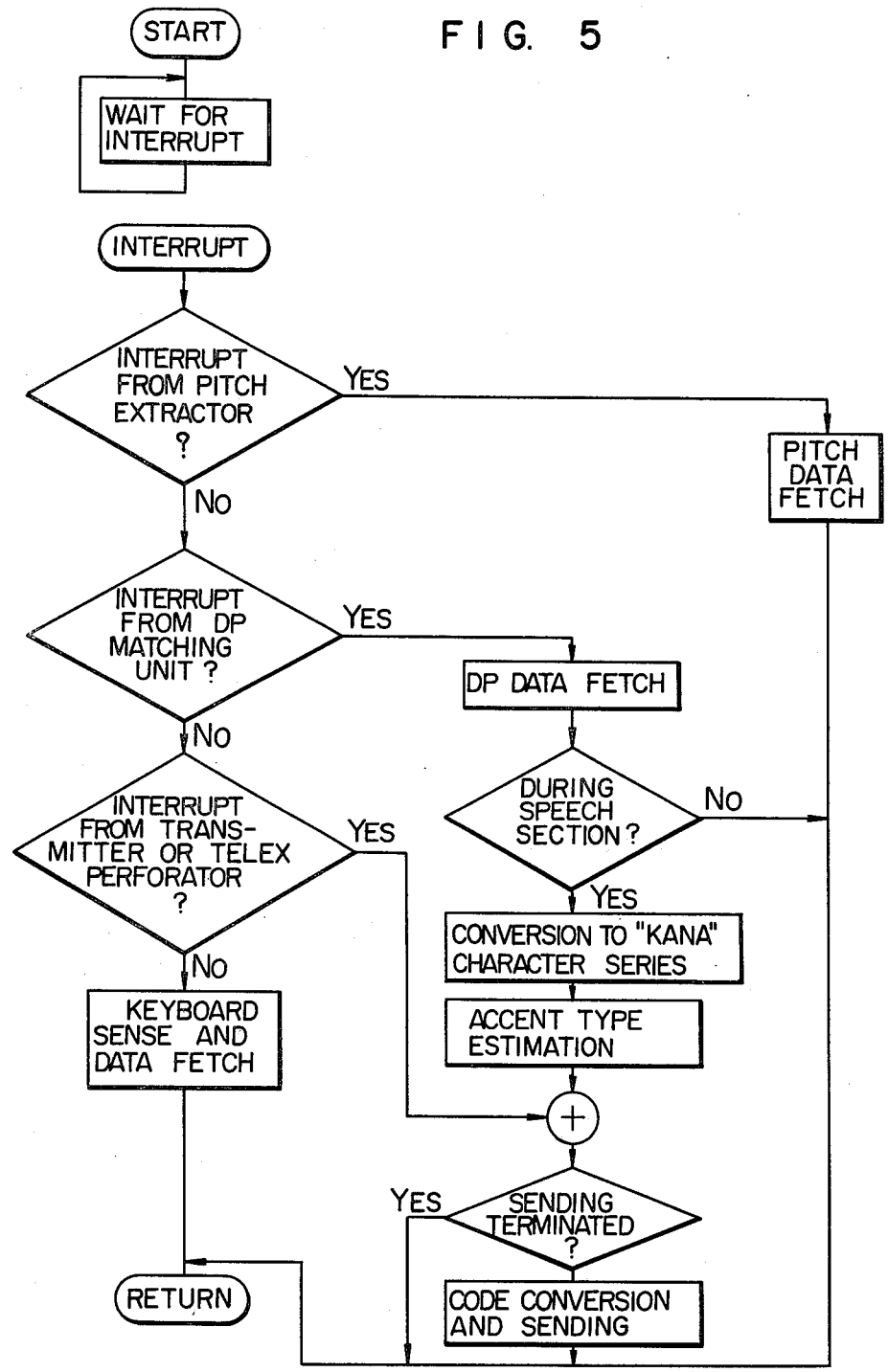
FIG. 5 shows a flow chart to illustrate operations of an overall or central controller shown in FIG. 2.

Referring to the flow chart shown in FIG. 5, in response to both DP data output from the DP matching unit 14 and the pitch frequency output from the PARCOR pitch period extractor 13, conversion to "kana" series is performed. Subsequently, estimation of accent type is made for the pitch pattern extracted in correspondence to a "kana" series in a one-breath speech section in accordance with the procedures disclosed in the Fujisaki et al article recited hereinbefore. FIG. 7 illustrates schematically a method of estimating the accent type. The accent type may be determined by making use of likelihood function models in the following manner.

It is assumed that the pitch frequency at a time point t is represented by f(t). Then, from equations:

$$Gv(t) = Av\alpha t + e^{-\alpha t} \qquad (1)$$

$$Ga(t) = Aa\{1 - (1+\beta t)e^{-\beta t}\} \qquad (2)$$

where Av, Aa, $\alpha$ and $\beta$ are constants, $$\text{Log } f(t) = \text{Log } f_{min.} + Gv(t-T_0) - Gv(t-T_3) + Ga(t-T_1) - Ga(t-T_2) \qquad (3)$$

where $f_{min.}$ represents a constant.

Values of $T_0$, $T_1$, $T_2$ and $T_3$ in a pitch pattern corresponding to a speech section per one breath are determined so as to best meet the equation (3). A number applied to that "kana" character of the speech section which precedes immediately to the appearance of the optimum value $T_3$ is used to identify the code for the accent type. Referring to FIG. 7, a sum of a value derived from the equation (2) for $T_0$ and $T_3$ defining a section width and a value derived from the equation (3) for $T_1$ and $T_2$ defining another section width is compared with the output value from a pitch pattern as detected. The comparing operation is iterated by varying the speech section width until the difference resulting from the comparison has fallen within a residual error $\epsilon$.

Figure 8:
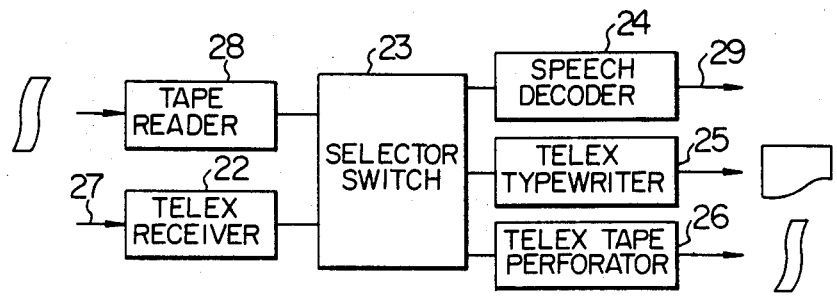
FIG. 8 is a block diagram to show an arrangement of a terminal receiver station shown in FIG. 1.

Next, the terminal receiver station will be described. Referring to FIG. 8 which shows in a block diagram a general arrangement of the terminal receiver station according to an embodiment of the invention, the speech information signal transmitted through a transmission line 27 is received by a receiver circuit 22 in which the received information signal is converted into a corresponding character code train signal to be supplied to a voice speech output circuit 24 by way of a record/reproduction selection switch 23. The character code train is then decoded to a corresponding voice speech signal 29 to be reproduced. The received code signal is supplied also to Telex typewriter output equipment 25 and/or Telex tape punch equipment 26 to be printed or recorded in perforation arrays. For the printing by means of the typewriter 25, only the characters are printed with the accent type identifying codes being neglected. The recorded tape may be loaded into a tape reader 28 for reproduction in the form of audible speech or printed characters.

Figure 9:
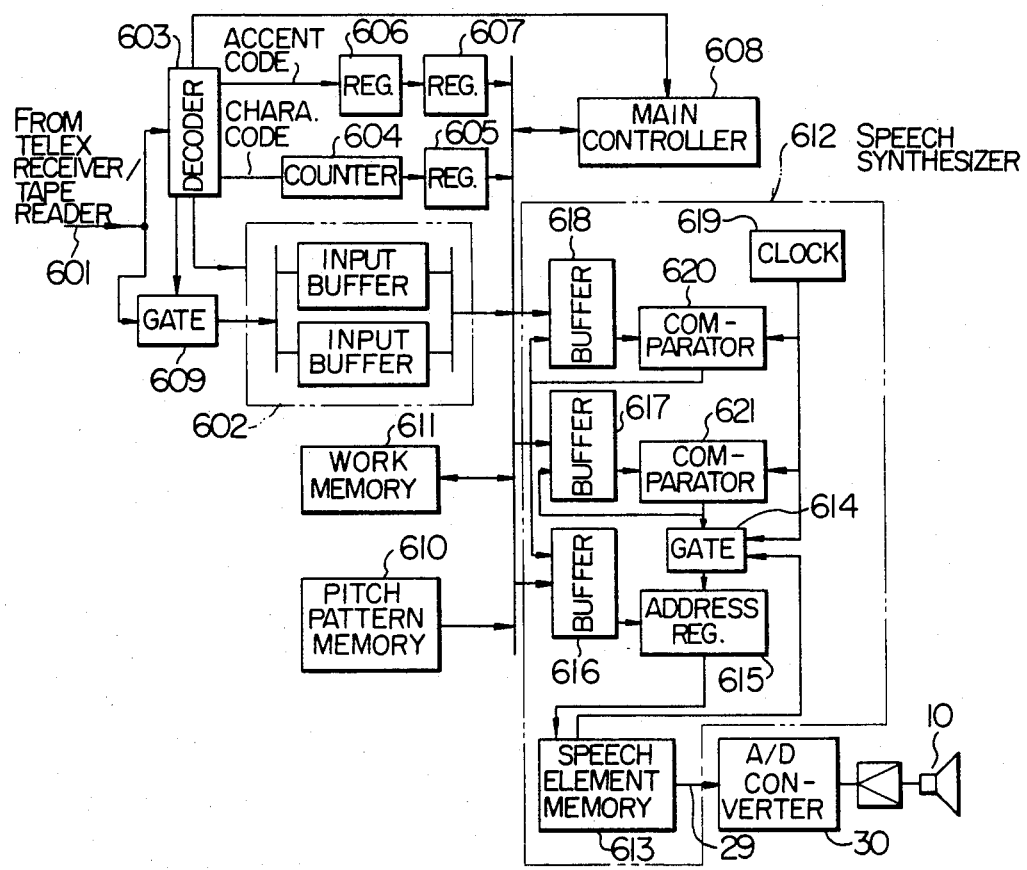
FIG. 9 is a circuit diagram showing in detail an arrangement of an audible speech information output circuit.

FIG. 9 shows a typical embodiment of the speech decoder i.e., voice speech output circuit 24. The speech retrieving procedures disclosed in the above-referenced Japanese Laid-Open Patent Application may be adopted in the voice speech output circuit 24 shown in FIG. 9. Referring to the figure, data on an output line 601 from the receiver circuit 27 is applied to a decoder 603. Only when the input data is in the form of "kana" code, a gate 609 is opened, whereby the input data is sequentially written in one of dual input buffer registers 602 which can be changed over to each other. Thus, only the "kana" code data may be placed in the input buffer registers 602. Each time the "kana" code data is received, a counter 604 is incremented by the decoder 603 for counting the number of the received "kana" characters. The incoming accent type code is written in a register 606. Upon reception of the space code, the decoder 603 transfers the contents of the counter 604 (i.e. the counted number of "kana" characters) to a register 605, while the contents of the register 606 (i.e. the accent type code) is transferred to a register 607, to clear subsequently the counter 604 and the register 606. At the same time, one of input buffer registers 602 which has served for the write-in operation is changed over to the read-out mode, while the other buffer register is changed over to the write-in operation mode. Concurrently, an interrupt request is issued to a main controller 608.

The main controller 608 is constituted by a microprocessor and informed through the interrupt request that the data corresponding to a one-breath speech section has been received. Information of the number of "kana" characters placed in the register 605 as well as the accent type code contained in the register 607 is now available to the main controller 608 which will then first fetch only the "kana" character data from one of the dual buffer registers 602 which is now in the read-out mode, to thereby perform the processings required for reproduction of the speech signal. Standard pitch patterns for the individual syllables which are previously stored in a pitch pattern memory 610 are selectively taken out to be utilized for synthesis of the speech signal in cooperation with a work memory 611. Reference numeral 612 represents a speech synthesizer. In the case of the synthesizing method being described, the speech information for every syllable is stored in a speech-element storing memory 613 so as to be read out therefrom as a sequential time series of pitch-synchronized speech elements. Thus, the syllable is utilized as a control quantity for a linguistic form, while the pitch-synchronized speech element is utilized as a control quantity for the pitch and the syllable length.

After the input "kana" character code train has been converted into a time series of syllables with the accent type being estimated if necessary (e.g. in case the accent type identifying code is absent), corresponding standard monosyllable patterns are synthesized while being modified by the time length of the individual syllables and the pitch information. The syllable codes are converted into a series of the first addresses of corresponding syllable speech element blocks in the memory 613. Since each of the individual speech elements is prepared in a predetermined length, the first address of the single block once determined will allow the addresses for the succeeding pitch-synchronized speech elements to be automatically determined. In addition to the wave information for the speech elements, there is stored in the memory 613 the information about the number of times of the use of the speech element together with the information as to whether the speech element in concern is voiced or unvoiced. Thus, in the case of the unvoiced speech element, the address register 615 for the memory 613 is inhibited from being incremented by the pitch information through a gate circuit 614. Numeral 616 designates a buffer memory for storing therein the first addresses of the syllable blocks. Numeral 617 denotes a buffer memory for the pitch information, and 618 designates a buffer memory for storing the data of the time length or duration. The pitch data and the time length data are subjected to comparison with a predetermined number of clock pulses from a clock generator 619 at comparators 620 and 621, respectively. When the number of the counted clock pulses has attained the contents in the time length data buffer 618, the time length data and the syllable address data are updated. When the pitch period is attained by the counted clocks as determined by the pitch controlling comparator 621, data placed in the pitch data buffer 617 is replaced by succeeding data, while the address of the relevant speech element is stepped to the address for a succeeding speech element by controlling correspondingly the address register 615 through a gate 614. For repeated use, control is made to inhibit the updating of the address through the gate 614. In this manner, the speech data is sequentially taken out from the speech element memory 613, and thus, the speech signal 29 produced by the memory 613 is subjected to digital-to-analog conversion through A/D converter 30 to be reproduced as a voice speech through a speaker 10.

In the foregoing description, the speech synthesizer is arranged to be suited for Japanese language. In the case of English, there may be employed, for example, a speech synthesizer which is commercially available from Vocal Interface Inc. under the trade name "VO-TRAX" and which is implemented in a four-channel accent type microcomputer-controlled system. In such a case, the units of successive phonemes other than those stated above e.g., CVC, CV, VC or CC must also be taken into consideration. Although the above embodiment is described to use speech element data stored in a memory for speech synthesis, it should be understood that the invention is widely applicable using a speech synthesizer which can directly synthesize a voice speech signal on the basis of a transmitted character code signal without data stored memory.

We claim:

1. An apparatus for transmitting speech information through a Telex system, comprising:
    (a) speech input conversion means for converting an analog speech signal to be transmitted into a corresponding digital speech signal;
    (b) speech extracting and compressing means for preparing a character code train of a low bit rate by extracting at least one of syllable units and phonetic symbols from said digital speech signal and compressing the extracted syllable units or phonetic symbols, and for determining accent types of words or phrases contained in said character code train to produce an accent identifying code;
    (c) Telex coding means for converting the character code train of the low bit rate and said accent identifying code into a Telex code signal;
    (d) channel means for transmitting the Telex code signal;
    (e) code conversion means for converting said transmitted telex code signal into a corresponding signal train of the syllable units or phonetic symbols and an accent type identifying signal; and
    (f) speech information decoding means for decoding said signal train and said accent type identifying signal from the output of said code conversion means to synthesize voice speech to thereby reproduce the information of the speech signal,
    wherein said extracting and compressing means (b) includes a circuit for extracting partial autocorrelation coefficients (PARCOR) and pitch frequency for the input speech signal, a DP matching circuit for determining phoneme information on the basis of the PARCOR signal, and an operation controller circuit adapted to execute processing for converting said phoneme information signal into a syllable series signal and determining the accent type from the pitch frequency series, said code conversion means (e) includes a controller for identifying the character code train from the incoming telex code signal transmitted through said channel and converting the character code train into a time series signal of the syllable units or phonetic symbols, and said speech information decoding means (f) includes a pitch pattern memory for previously storing standard pitch patterns for speech characters and producing corresponding pitch pattern information in response to the incoming character code train, a speech synthesizer including a speech element memory for previously storing predetermined waveforms of speech elements and adapted to respond to said time series signal from said controller means to thereby produce a speech signal of the syllable units or phonetic symbols in the form of a time series of the speech elements each of which corresponds to a pitch unit, whereby said speech element memory is controlled by said pitch pattern information output from said pitch pattern memory to produce a speech waveform signal having a duration determined by said pitch pattern information, and means for converting the speech waveform signal output from said speech synthesizer to a speech signal.

2. An apparatus according to claim 1, wherein said Telex coding means (c) includes said operation controller circuit and is adapted for allotting Telex codes to the data representing the syllable units while allotting unallocated Telex code positions to the accent type identifying data, thereby to prepare a Telex signal constituted by the syllable series incorporating the accent type identifying codes.

3. An apparatus according to claim 2, further including Telex input/output means coupled to the output of said Telex coding means (c), whereby a speech data signal from said Telex coding means is enabled to be recorded on a recording tape of said Telex input/output means, so that said speech data signal can be sent out to said transmission channel at a given time by means of sender apparatus provided in said Telex input/output means.

4. An apparatus according to claim 2, wherein said controller includes a decoder coupled directly to a readout output of said input/output means or output terminal of a tape reader provided at the receiver side of said transmission channel for separating the syllable data codes and the accent type identifying codes, registers coupled to the output of said decoder and adapted to store said syllable data codes and said accent type identifying codes, respectively, a counter coupled to said decoder for counting the number of the syllable data codes between space codes; and a main control circuit for converting said syllable data code train into a time series of syllable units and controlling said speech synthesizer depending on the outputs of said registers and said counter.

5. An apparatus according to claim 4, wherein the output of the register which stores therein the syllable code data is adapted to be selectively coupled to the input of a Telex typewriter.

6. An apparatus for encoding speech information comprising:
   (a) A/D converter means for converting an analog input speech signal into a corresponding digital speech signal;
   (b) an extractor circuit for extracting partial autocorrelation coefficient (PARCOR) data and pitch frequencies from the digital speech signal;
   (c) a dynamic programming matching circuit for comparing on the basis of said PARCOR data the input speech signal successively with standard patterns previously stored in a standard pattern memory to detect a vowel-consonant-vowel (VCV) train which coincides with the standard patterns, to thereby segment said input speech signal into syllable units;
   (d) an operation control circuit for converting the syllable units of the segmented input speech signal into character codes and estimating accent position in a syllable unit series of the input speech signal on the basis of said pitch frequency series to thereby produce corresponding accent identifying codes; and
   (e) means for combining said character codes with Telex code positions in one-to-one correspondence while combining said accent identifying codes with telex unallocated code positions.

7. A speech decoding apparatus comprising:
   (a) a decoder for extracting separately character codes and accent identifying codes from a speech information containing Telex signal transmitted and/or recorded in a Telex system;
   (b) first and second buffer memories for temporally storing the character codes and the accent identifying codes as separately extracted, respectively;
   (c) a main control circuit for editing said character codes into syllable data;
   (d) speech element memory means for storing therein a series of the speech elements for each syllable such that the data edited by the main control circuit may be read out in a sequence corresponding to a time series of the speech elements in a natural voice speech;
   (e) a signal processing circuit responsive to syllable data from said first buffer memory which data constitutes a speech word to be synthesized for providing a read signal for reading a series of corresponding speech element information, a pitch control signal for designating a read-out duration for each speech element information in each of said series of speech element information, and a syllable duration control signal for designating a time duration of each syllable;
   (f) a speech element information synthesizing circuit responsive to said control signals for synthesizing said series of said speech element information read-out from said speech element memory means into a speech element information train signal corresponding to a word to be synthesized; and
   (g) circuit means for converting said speech element information train signal into a voice speech signal.

* * * * *